United States Patent
Liu et al.

(10) Patent No.: US 11,247,410 B2
(45) Date of Patent: *Feb. 15, 2022

(54) PACKAGE FOR INDICATING HEAT-SEAL CONDITION

(71) Applicant: Bemis Company, Inc., Neenah, WI (US)

(72) Inventors: Yuan Liu, Neenah, WI (US); Xiangke Shi, Neenah, WI (US)

(73) Assignee: Bemis Company, Inc., Neenah, WI (US)

( * ) Notice: Subject to any disclaimer, the term of this patent is extended or adjusted under 35 U.S.C. 154(b) by 201 days.

This patent is subject to a terminal disclaimer.

(21) Appl. No.: 16/462,817

(22) PCT Filed: Dec. 2, 2016

(86) PCT No.: PCT/US2016/064728
§ 371 (c)(1),
(2) Date: May 21, 2019

(87) PCT Pub. No.: WO2018/101964
PCT Pub. Date: Jun. 7, 2018

(65) Prior Publication Data
US 2019/0375167 A1    Dec. 12, 2019

(51) Int. Cl.
*B29C 65/02* (2006.01)
*B29C 65/82* (2006.01)
(Continued)

(52) U.S. Cl.
CPC .............. *B29C 66/98* (2013.01); *B29C 65/02* (2013.01); *B29C 65/8253* (2013.01);
(Continued)

(58) Field of Classification Search
CPC ... B29C 65/02; B29C 65/8253; B29C 66/433; B29C 66/9141; B29C 66/9192;
(Continued)

(56) References Cited

U.S. PATENT DOCUMENTS 3,616,898 A * 11/1971 Massie ................. B65D 75/326
206/216
4,097,288 A     6/1978 Lawton
(Continued)

FOREIGN PATENT DOCUMENTS

EP      1947440 A2    7/2008
EP      2179936 A1    4/2010
(Continued)

*Primary Examiner* — Matthew Luu
*Assistant Examiner* — Kendrick X Liu

(57) ABSTRACT

Heat-seal condition indicating packages include a first sealing substrate comprising a leuco dye and a second sealing substrate comprising a leuco dye developer. The packages may optionally include a leuco dye sensitizer which dissolves both the leuco dye and the leuco dye developer when melted. The packages further include a heat-seal produced between the first sealing substrate and the second seating substrate. The heat-seal comprises a reaction product of the leuco dye and the leuco dye developer. The reaction product may be colored, which may provide the heat-seal with a detectable optical characteristic. A magnitude of the optical characteristic may be proportion to the strength of the seal between the first and second seating substrates.

20 Claims, 5 Drawing Sheets

(51) Int. Cl.
  *B29C 65/00* (2006.01)
  *B41M 3/00* (2006.01)
  *B41M 5/28* (2006.01)
  *B41M 5/333* (2006.01)
  *B41M 5/323* (2006.01)
  *B65D 75/28* (2006.01)
  *B41M 5/26* (2006.01)

(52) U.S. Cl.
  CPC .......... *B29C 66/43* (2013.01); *B29C 66/433* (2013.01); *B29C 66/723* (2013.01); *B29C 66/9141* (2013.01); *B29C 66/97* (2013.01); *B41M 3/001* (2013.01); *B41M 5/28* (2013.01); *B41M 5/282* (2013.01); *B65D 75/28* (2013.01); *B41M 5/26* (2013.01); *B41M 5/323* (2013.01); *B41M 5/333* (2013.01)

(58) Field of Classification Search
  CPC ........ B29C 66/97; B29C 66/98; B41M 3/001; B41M 5/282; B41M 5/333; B41M 5/323
  See application file for complete search history.

(56) References Cited

U.S. PATENT DOCUMENTS

| | | |
|---|---|---|
| 4,516,679 A | 5/1985 | Simpson et al. |
| 4,714,595 A | 12/1987 | Anthony et al. |
| 5,066,633 A | 11/1991 | Shibata et al. |
| 5,184,190 A | 2/1993 | Rai et al. |
| 5,206,118 A | 4/1993 | Sidney et al. |
| 5,631,068 A | 5/1997 | Smith |
| 5,727,684 A | 3/1998 | Webb et al. |
| 5,787,681 A | 8/1998 | Papina et al. |
| 6,059,319 A | 5/2000 | Wyke |
| 6,251,571 B1 | 6/2001 | Dessauer et al. |
| 6,265,344 B1 | 7/2001 | Shimbo et al. |
| 6,471,058 B2 | 10/2002 | Kannabiran et al. |
| 6,596,354 B1 | 7/2003 | Longdon et al. |
| 7,464,518 B2 | 12/2008 | Ansinn |
| 7,673,498 B2 | 3/2010 | De Baerdemaeker et al. |
| 7,829,497 B2 | 11/2010 | Filosa et al. |
| 8,387,348 B2 | 3/2013 | Caudle et al. |
| 8,500,895 B2 | 8/2013 | Blank et al. |
| 10,822,150 B2 * | 11/2020 | Shi .......... G01N 21/78 |
| 2003/0035917 A1 | 2/2003 | Hyman |
| 2007/0269740 A1 | 11/2007 | Blank et al. |
| 2008/0145940 A1 | 6/2008 | Menon |
| 2008/0173385 A1 * | 7/2008 | Ansinn .......... G01M 3/38 156/64 |
| 2009/0117389 A1 | 5/2009 | Amberg-Schwab et al. |
| 2009/0143516 A1 | 6/2009 | MacDonald et al. |
| 2011/0127188 A1 | 6/2011 | Thompson et al. |
| 2014/0044609 A1 | 2/2014 | Prusik et al. |
| 2014/0342903 A1 | 11/2014 | Jarvis et al. |
| 2016/0178057 A1 * | 6/2016 | Sabotta .......... F16J 15/064 277/318 |

FOREIGN PATENT DOCUMENTS

| | | |
|---|---|---|
| JP | H05158010 A | 6/1993 |
| JP | H07271302 A | 10/1995 |
| JP | 2000238724 A | 9/2000 |
| WO | 9604177 A2 | 2/1996 |
| WO | 2004087430 A1 | 10/2004 |
| WO | 2008024537 A2 | 2/2008 |
| WO | 2009000034 A1 | 12/2008 |

* cited by examiner

PACKAGE FOR INDICATING HEAT-SEAL CONDITION

This disclosure relates to the manufacture of sealed packages and more particularly to packages formed from packaging materials which can indicate defects and flaws in heat-seal areas of these packages.

A broad range of products are packaged in airtight conditions in order to prolong shelf life, to guarantee quality, or to preserve sterility. Such products range from food and beverages to medical, electrical and pharmaceutical items. Ensuring high quality sealing of the package is an important aspect in the packing process. Seal quality may encompass a number of issues such as airtightness, inclusions, strength and visual appearance.

A real or perceived decrease in quality of a product sealed in the package may result if the package is not sealed by a quality seal. For example, a product sealed in the package may be rejected by a consumer based on the visual appearance of the package. In addition or alternatively, the quality of the product inside the package may rapidly deteriorate in terms of, for example, visual appearance, flavor, and sterility.

Heat-seals in plastic films are generally formed by a band sealer that, through the application of heat and pressure over a narrow area in the plastic films, partially melts and fuses the thermoplastic substrates in the plastic films. Quality of the seal is affected by a number of variables such as the temperature of the process, the pressure exerted on the sealing substrates, and the cleanness of the sealing process. Flaws and defects can be encountered during the sealing process when the band sealer temperature, transitional speed or pressure varies, when the film substrates wrinkle or twist during sealing, when foreign material is introduced into the seal, or the like. Inclusion of flaws and defects into the seal often produces weak seals that may deteriorate and fail under the intended specific application. Failure of the seal can have adverse effects ranging from product spoilage to loss of sterility in medical applications.

The present disclosure among other things, describes the use of two component color indicators for determining whether quality (e.g., sufficient for a given application) heat seals are formed in packages. For example, intimate contact between a layer having the first component and a layer having the second component, one of which is a color component, can result in a color change due to interaction or reaction between the two components, and thus can provide a visual indicator of a quality seal. As a specific example, a leuco dye may be in or on a first sealing substrate, and a leuco dye developer may be in or on a second sealing substrate. A color change can occur when a quality heat seal is formed between the first and second sealing substrates by bringing the leuco dye and the leuco dye developer into intimate contact to produce a colored reaction product.

In various aspects described herein, a heat-seal condition indicating package includes a first sealing substrate comprising a leuco dye and a second sealing substrate comprising a leuco dye developer. The package also includes a heat-seal coupling the first sealing substrate to the second sealing substrate. The heat-seal comprises a colored reaction product of a leuco dye and a leuco dye developer. An optical characteristic indicative of the colored reaction product in the heat seal is detectable. Preferably, a magnitude of the optical characteristic is proportional (e.g., directly proportional or indirectly proportional) to a strength of the coupling between the first and second sealing substrates in the heat-seal over at least a range of strengths of the seal.

In various aspects described herein, a heat-seal condition indicating package includes a first sealing substrate comprising a leuco dye; a second sealing substrate comprising a leuco dye developer; and a heat-seal coupling the first sealing substrate to the second sealing substrate. The heat seal has a detectable optical property indicative of a strength of the coupling of the first sealing substrate to the second sealing substrate in the heat-seal.

In various aspects described herein, a heat-seal condition indicating package includes a first sealing substrate comprising a leuco dye and a second sealing substrate comprising a leuco dye developer. The package also includes a heat-seal region in which the first sealing substrate is coupled to the second sealing substrate. The heat-seal region comprises a colored reaction product of a leuco dye and a leuco dye developer (if at least a portion of the heat-seal region is sealed to at least a minimal degree). The package further includes a non-seal region adjacent to the heat seal region. The colored reaction product provides the heat-seal region with an optical characteristic different than the non-seal region (provided that a sufficient amount of the colored reaction product is produced, the difference the optical characteristic should be detectable). Preferably, a magnitude of a difference in the optical characteristic between the heat-seal region and the non-seal region is proportional (e.g., directly proportional or indirectly proportional) to the strength of the coupling of the first sealing substrate to the second sealing substrate in the heat-seal region over at least a range of strengths of the seal. Preferably, a magnitude of a difference in the optical characteristic between the heat-seal region and the non-seal region is proportional to the strength of the coupling of the first sealing substrate to the second sealing substrate in the heat-seal region.

For purposes of the present disclosure, a "non-seal" region is a region that is not intended to be heat sealed. That is, a non-seal region is not subjected to heat and pressure for purposes of heat sealing. A non-seal region is distinct from a region of the package intended to be heat sealed but not effectively sealed due to a defect.

In various embodiments described herein, a heat-seal condition indicating package includes a first sealing substrate comprising a leuco dye; a second sealing substrate comprising a leuro dye developer; a heat-seal region coupling the first sealing substrate to the second sealing substrate; and a non-seal region adjacent to the heat seal region. The heat-seal region has a detectable optical characteristic different than the non-seal region, and wherein the detectable optical characteristic indicative of a strength of the coupling of the first sealing substrate to the second sealing substrate in the heat-seal region.

In some embodiments of the packages described herein, the detectable optical characteristic comprises a visible color change produced when the first sealing substrate is heat sealed to the second sealing substrate.

In some embodiments, the packages described herein are configured such that, when a strength of the heat seal is consistent along a length of the heat-seal or the heat seal region, a variance in magnitude of the optical characteristic along the heat-seal or heat-seal region does not exceed a variance threshold. As used herein, a "variance threshold" is a threshold of variance between measurements at three or more locations.

In some embodiments, the packages described herein are configured such that the difference of (i) a magnitude of the optical characteristic in a first region of the heat seal and (ii) a magnitude of the optical characteristic in a second region of the heat seal exceeds a differential threshold when a defect is present in the heat-seal. As used herein, a "differential threshold" is a threshold of an (absolute) value of the difference in the magnitude of a measurement at a first location and at a second location.

In various aspects described herein, a method includes providing a first sealing substrate comprising a leuco dye; providing a second sealing substrate comprising a leuco dye developer; and heat sealing the first sealing substrate to the second sealing substrate to produce a colored reaction product of the leuco dye and the leuco dye developer.

In some embodiments, the methods described herein further include detecting an optical characteristic indicative of the colored reaction product at a region in which the first substrate is heat sealed to the second substrate. The methods may further include correlating a magnitude of the detected optical characteristic with a strength of the seal between first sealing substrate and the second sealing substrate. In addition or alternatively, the methods may further include determining that the quality of the heat seal is sufficient if a magnitude of the detected optical characteristic meets or exceeds an absolute threshold, or determining that the quality of the heat seal is insufficient if a magnitude of the detected optical characteristic is less than the absolute threshold. As used herein, an "absolute threshold" is a threshold of a magnitude of a measurement at a single location.

In some embodiments, the methods described herein further include detecting the optical characteristic indicative of the colored reaction product at a first region in which the first substrate is heat sealed to the second substrate; detecting the optical characteristic indicative of the colored reaction product at a second region in which the first substrate is heat sealed to the second substrate; and comparing magnitudes of the detected optical characteristic between the first and second regions. The methods may further include determining whether a difference between the magnitudes of the detected optical characteristic between the first and second regions meets or exceeds a predetermined differential threshold, and may optionally further include determining that a quality of the heat seal between the first and second substrates is insufficient if the difference meets or exceeds the differential threshold, or determining that a quality of the heat seal between the first and second substrates is sufficient if the difference is less than the differential threshold.

In some embodiments, the methods described herein may further include detecting the optical characteristic indicative of the colored reaction product at a plurality of locations in a region in which the first sealing substrate is heat sealed to the second sealing substrate; and determining a variance in magnitudes of the detected optical characteristic at the plurality of locations. The methods may further include determining whether the variance in magnitudes of the detected optical characteristic at the plurality of locations meets or exceeds a predetermined variance threshold, and may optionally include determining that a quality of the heat seal between the first and second substrates is insufficient if the variance meets or exceeds the variance threshold, or determining that a quality of the heat seal between the first and second substrates is sufficient if the variance is less than the variance threshold.

In some embodiments of the methods described herein, heat sealing the first sealing substrate to the second sealing substrate produces a package comprising a heat-seal region in which the first sealing substrate is heat sealed to the second sealing substrate and a non-seal region in which the first sealing substrate is not heat sealed to the second sealing substrate. The methods may further include detecting an optical characteristic indicative of the colored reaction product at the heat-seal region; detecting the optical characteristic indicative of the colored reactor product at the non-seal region; and comparing the optical characteristic detected at the heat-seal region to the optical characteristic detected at the non-seal region, and may optionally include determining a difference in a magnitude of the detected optical characteristic at the heat-seal region to a magnitude of the detected optical characteristic at the non-seal region; and correlating the difference in magnitude with a strength of the seal between the first and second sealing substrates in the heat-seal region.

In various embodiments described herein, a method includes providing a first sealing substrate comprising a leuco dye; providing a second sealing substrate comprising a leuco dye developer; and heat sealing the first sealing substrate to the second sealing substrate to produce a heat-seal. Producing the heat-seal results in a change in an optical characteristic at the heat-seal.

In various embodiments described herein, a system for producing a heat-seal condition indicating package includes a first sealing substrate comprising a leuco dye; and a second sealing substrate comprising a leuco dye developer. The first sealing substrate is configured to be heat sealed to the second sealing substrate to produce the package. Heat sealing the first sealing substrate to the second sealing substrate produces a colored reaction product of the leuco dye and the leuco dye developer. An optical characteristic indicative of the colored reaction product is detectable in a region of a heat-seal after the first sealing substrate is sealed to the second sealing substrate.

In various embodiments described herein, a system for producing a heat-seal condition indicating package includes a first sealing substrate comprising a leuco dye; and a second sealing substrate comprising a leuco dye developer. The first sealing substrate is configured to be heat sealed to the second sealing substrate to produce the package. Heat sealing the first sealing substrate to the second sealing substrate results in an optical characteristic detectable in a region of a heat-seal.

In various aspects described herein, heat-seal condition indicating packages have a first sealing substrate comprising a leuco dye and a second sealing substrate comprising a leuco dye developer. The packages may include a leuco dye sensitizer which dissolves both the leuco dye and the leuco dye developer when melted. The leuco dye sensitizer, if present, may be disposed in or on one or both of the surface of the first sealing substrate and the surface of the second sealing substrate. The packages further include a heat-seal produced between the first sealing substrate and the second sealing substrate. The heat-seal comprises a heat-seal defect-free state which produces a visible color change within the heat-seal after the heat sealing process, and a heat-seal defect state which produces, within the heat-seal after the heat sealing process, a visibly less saturated color change than when in the heat-seal defect-free state.

In various aspects described herein, a system for producing a heat-seal condition indicating package includes first and second sealing substrates. The first sealing substrate comprising a heat seal layer and at least one additional layer selected from the group consisting of a barrier layer, a bulk layer, an exterior protective layer, and a tie layer. The second sealing substrate is heat sealable to the first sealing substrate via the heat seal layer. The first sealing substrate comprises one of a leuco dye and a leuco dye developer and the second sealing substrate comprises the other of the leuco dye and the leuco dye developer. The first and second sealing substrates are configured such that heat sealing the first sealing substrate to the second sealing substrate forms a heat-seal comprising a heat seal defect-free state and/or a heat seal defect state existing between the first sealing substrate and the second sealing substrate. In the heat-seal defect-free state, the package produces a visible color change within the heat-seal after heat sealing the first sealing substrate to the second sealing substrate. In the heat-seal defect state, the package produces a visibly less saturated color change relative to the color change produced in the heat-seal defect-free state.

In various aspects described herein, a method for producing a heat-seal condition indicating package includes heat sealing a first sealing substrate to a second sealing substrate to produce the package. The first sealing substrate comprises a heat seal layer and at least one additional layer selected from the group consisting of a barrier layer, a bulk layer, an exterior protective layer, and a tie layer. The first sealing substrate comprises one of a leuco dye and a leuco dye developer and the second sealing substrate comprises the other of the leuco dye and the leuco dye developer. Heat sealing the first sealing substrate to the second sealing substrate forms a heat-seal comprising a heat seal defect-free state and a heat seal defect state existing between the first sealing substrate and the second sealing substrate. In the heat-seal defect-free state, the package produces a visible color change within the heat-seal after heat sealing the first sealing substrate to the second sealing substrate. In the heat-seal defect state, the package produces a visibly less saturated color change relative to the color change produced in the heat seal defect-free state.

In various aspects described herein, a heat-seal condition indicating package includes a first sealing substrate comprising a leuco dye; a second sealing substrate comprising a leuco dye developer; and a heat-seal produced between the first sealing substrate and the second sealing substrate. The heat seal comprises a heat seal defect-free state and/or a heat seal defect state existing between the first sealing substrate and the second sealing substrate. In the heat-seal defect-free state, the package produces a visible color change within the heat-seal after heat sealing the first sealing substrate to the second sealing substrate. In the heat-seal defect state, the package produces a visibly less saturated color change relative to the color change produced in the heat-seal defect-free state. The first and second sealing substrates are substantially free of a leuco dye sensitizer.

In various aspects described herein, a system for producing a heat-seal condition indicating package includes a first sealing substrate comprising a leuco dye; and a second sealing substrate comprising a leuco dye developer, wherein the second sealing substrate is heat sealable to the first sealing substrate. The first and second sealing substrates are configured such that heat sealing the first sealing substrate to the second sealing substrate produces a heat seal. The heat seal comprises a heat seal defect-free state and a heat seal defect state existing between the first sealing substrate and the second sealing substrate. In the heat-seal defect-free state, the package produces a visible color change within the heat-seal after heat sealing the first sealing substrate to the second sealing substrate. In the heat-seal defect state, the package produces a visibly less saturated color change relative to the color change produced in the heat-seal defect-free state. The first and second sealing substrates are substantially free of a leuco dye sensitizer.

In various aspects described herein, a method for producing a heat-seal condition indicating package includes heat sealing a first sealing substrate to a second sealing substrate. The first sealing substrate comprises a leuco dye. The second sealing substrate comprises a leuco dye developer. Heat sealing the first sealing substrate to the second sealing substrate produces a heat seal that comprises a heat seal defect-free state and/or a heat seal defect state existing between the first sealing substrate and the second sealing substrate. In the heat-seal defect-free state, the package produces a visible color change within the heat-seal after heat sealing the first sealing substrate to the second sealing substrate. In the heat-seal defect state, the package produces a visibly less saturated color change relative to the color change produced in the heat-seal defect-free state. The first sealing substrate and second sealing substrate are substantially free of a leuco dye sensitizer.

If the heat sealing process is performed properly and the leuco dye and leuco dye developer should interact, in some cases with the assistance of a leuco dye sensitizer, to produce a reaction product between the leuco dye and the leuco dye developer. The reaction product in the heat-seal may impart an optical property to the heat-seal that may allow a determination to be made regarding whether the heat-seal is of sufficient quality for the intended purpose of the package (e.g., a given application of the package). The reaction product preferably produces a color change.

In many circumstances, more reaction product may be produced as the temperature or pressure applied to form the heat-seal is increased, due at least in part to greater potential interaction between the leuco dye and the leuco dye developer in the heat-seal region. Similarly, the strength of the coupling between the first and second heat sealed substrates may be increased at heat sealing temperatures and pressures are increased. Accordingly, the magnitude of the optical characteristic of the heat-seal may be proportional (e.g., directly proportional or indirectly proportional) to the strength of the coupling between the first substrate and the second substrate in the heat seal over at least a range of strengths of the seal. The magnitude of the optical characteristic may increase as the seal strength increases, but may reach a point of saturation at which further increases in seal strength do not result in further detectable increases in the absolute value of the optical characteristic. In some embodiments, the magnitude of the optical characteristic may be proportion to the peel strength of the heat-seal over at least a range of the peel strength.

A suitable range of magnitude of the optical characteristic may vary depending on the desired strength of the seal. For example, if the package is an "easy peel" package, the magnitude of the optical characteristic that is indicative of a suitable seal quality may be less than if the package is intended to resist tearing by un-aided human force. Alternatively, the amount or type of leuco dye, leuco dye developer and/or leuco dye sensitizer employed may be varied to produce a more consistent change in optical characteristic across packages that are intended to have different seal strengths.

In some circumstances, a suitable seal strength may correlate to a magnitude of the optical characteristic within a range. In other circumstances, a suitable seal strength may correlate to a magnitude of the optical characteristic that meets or exceeds an absolute threshold.

If the heat sealing process is performed properly and there are no seal-compromising flaws or defects present, an optical characteristic indicating a quality heat-seal should be consistent the entire heat-seal. For example, a variance in magnitude of the optical characteristic along the heat-seal should not exceed a variance threshold. If the variance exceeds a variance threshold, the quality of the heat-seal may be determined to be poor, of if the variance does not meet or exceed the variance threshold, the quality of the heat-seal may be determined to be of good quality, particularly if the magnitude of the optical characteristic is also indicative a quality seal. The magnitude of an optical characteristic of the heat-seal may be determined at a plurality of locations across the heat-seal to determine whether the variance meets or exceeds the variance threshold.

The threshold level of variance may change depending on the substrates employed, the leuco dyes and developers employed, whether a leuco sensitizer is employed, the desired strength of the seal, the optical characteristic measured or observed, and the like. For example, the variance is evaluated as a percentage, with the percentages that are indicative of a poor quality seal versus a quality seal are application dependent.

In some embodiments, a difference in magnitude of an optical characteristic between a first location of the heat-seal and a second location of the heat-seal may be used as a proxy to determine whether the heat-seal is of sufficient quality or strength. For example, a significantly large difference in the magnitude of the optical characteristic between a first area of the heat-seal, such as an area of the heat-seal that is free of defects, and a second area, such as an area of the heat-seal that includes a defect, may allow a determination to be made that heat-seal is of insufficient quality to be acceptable. Thus, rather than calculating a variance in magnitude of the optical characteristic across multiple locations, a single difference of sufficiently large magnitude may be sufficient to reject the package for containing a heat-seal of poor quality.

In some embodiments, a relative magnitude of an optical characteristic of the heat-seal may be obtained by comparing the optical characteristic of heat-seal region to a non-sealed area of the package. The relative magnitude or the variance of the relative magnitude may be used to determine whether the seal quality is sufficient.

Information regarding the nature of a defect in a heat-seal may be obtained based on magnitudes or variances in optical properties in the heat-seal. When there is a defect or flaw present, for example, debris such as dust or dirt between the two sealing substrates or not enough heat or pressure provided to form a quality seal, the debris or other defects will interfere with the mixing of the leuco dye and the leuco dye developer within a localized area of the heat-seal. Consequently, the magnitude of the optical property associated with the reaction product of the leuco dye and the leuco dye developer may be different where the debris or defect is present in the seal area, relative to a location where the heat-seal is free of defects. Where debris or a wrinkle is present in the heat-seal, localized changes in magnitude of the optical characteristic may be detectable. Where the temperature or pressure employed during the heat seal is too low, the magnitude of the optical characteristic across the entire heat seal may be low. Where there is build-up or debris present on heat sealing equipment at a location that contacts the first or second sealing substrate, a repeatable pattern of localized changes in magnitude of the optical characteristic may be detected.

Any suitable optical characteristic of the heat-seal may be employed in packages, systems and methods described herein. Preferably, the optical characteristic is indicative of the reaction product of the leuco dye and the leuco dye developer. Preferably, the reaction product of the leuco dye and the leuco dye developer is a colored reaction product. Accordingly, area of the heat-seal changes color when a proper heat seal is formed.

Accordingly, the optical characteristic may be a characteristic of visible light absorption, visible light transmission or visible light reflection. Thus, the optical characteristic, in some embodiments, may be visually observed. In some embodiments, the optical characteristic may be detected by appropriate equipment. By way of example, a spectrophotometer or suitable imaging equipment may be used to detect a change in an optical characteristic associated with heat sealing the first substrate comprising the leuco dye to the second substrate comprising the leuco dye developer. In some embodiments, the equipment may be present on a packaging manufacturing line to monitor the quality of the heat-seal in real-time or near real-time.

In some embodiments, a color indicator is provided on, in or with the package, where the color indicator provides a level of, for example, color saturation that is indicative of a quality heat seal. A user may compare the color saturation level of the heat seal to the color indicator. By way of example, the user may conclude that the heat seal is a quality seal if the heat seal color saturation level is not visibly less than the color saturation level of the color indicator. If the heat seal comprises a color saturation level visibly less than the color indicator, the user may conclude that the heat seal comprises a defect in, for example, a circumstance where the level color saturation is less than an absolute threshold indicative of a quality seal for a given application.

Any suitable optical characteristic of color may be detected to determine if a suitable heat seal has been produced if the detectable optical characteristic is a characteristic of color. For example, the presence or absence of a particular color may be detected, the saturation level (e.g., how "intense" or "concentrated" a color is), the shade, the tint, the hue, and/or the value or brightness of a color may be detected. For example, and in some embodiments, a better quality seal may be indicated by a higher degree of color saturation. In some embodiments, a lab color space system, such as a system as described in Example 7 below, may be employed to identify one or more optical characteristic associated with color to evaluate the sufficiency of a heat-seal.

It should be understood that the use of dyes and developers that produce reaction products that selectively absorb, transmit or reflect electromagnetic radiation outside of the visible spectrum, such as in the IR or UV spectrum, are contemplated herein and are within the scope of the description provided herein.

In some embodiments, the packages include a leuco dye sensitizer that melts and dissolves the leuco dye and the leuco dye developer to facilitate interaction between the dye and the sensitizer, which may result in a more enhanced color change than in packages that do not include the leuco dye sensitizer. During the heat sealing process, the leuco dye sensitizer may melt and dissolve the leuco dye and the leuco dye developer. The leuco dye sensitizer may be in or on one or both of the first substrate and the second substrate.

In some embodiments, the packages are free or substantially free of a leuco dye sensitizer. As used herein, a package that is "substantially free" of a leuco dye sensitizer is a package that includes no detectable amount of a leuco dye sensitizer or an amount of a leuco dye sensitizer that is not sufficient to visibly enhance color saturation, relative to a package that is free of a leuco dye sensitizer, when the first and second substrates are heat sealed together.

When the packages are free or substantially free of a leuco dye sensitizer, a sufficient amount of the dye and the developer are present at the interface between the first substrate and second substrate during heat sealing to produce a color change that exceeds a threshold color saturation level in a region in which a quality heat seal is formed. The leuco dye may be coated on the surface of the first sealing substrate and the leuco dye developer may be coated on the second sealing substrate to ensure that a sufficient quantity of the dye and the developer are present at the sealing interface. However, such coatings may slough off with handling, be prone to being scratched off or to other erosion, or the like.

Preferably, one or both of the dye and the developer are in their respective sealing substrates. If the dye or developer is in its respective substrate and if the first substrate and second substrate are substantially free of a leuco dye sensitizer, the dye or developer is capable of migrating to the sealing interface in sufficient quantities when a quality heat Any suitable leuco dye may be used in accordance with the teaching presented herein. Examples of suitable classes of leuco dyes include fluorans, rhodamines, and triarylmethane lactone leuco dyes. These compounds react with acidic developing agents, such as Lewis acids, salicylic acids, phenolic compounds or acidic clays, to form highly colored species by the opening of a lactone ring. Specific, examples of such compounds include without limitation those known under the trade name "PERGASCRIPT" (Ciba Specialty Chemicals of Tarrytown, N.Y.). Another example of a suitable leuco dye is the leuco dye crystal violet lactone (a triarylmethane lactone). In its lactone form, crystal violet lactone is at least substantially colorless, being colorless or slightly yellow. But, in a low pH environment, it becomes protonated and exhibits an intensely violet color, such as crystal violet lactone having the structure:

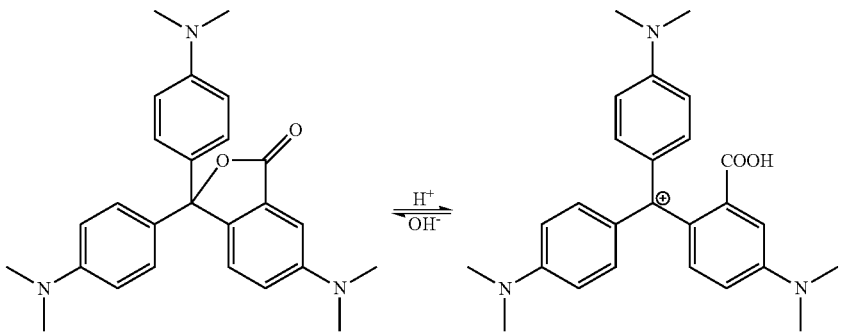

seal is formed. If the dye or developer is too compatible or soluble in the substrate, then the dye or developer may not sufficiently migrate to the interface during sealing, in which case a leuco dye sensitizer may be in or on one or both of the first end second substrates. However if the dye or developer are too incompatible or insoluble in the substrate, the dye or developer may migrate out of the substrate prior to sealing, such as during storage.

In some preferred embodiments, the leuco dye is in the first sealing substrate using conventional resin blending technology known in the art.

In some preferred embodiments, the leuco dye is applied onto the first sealing substrate using conventional printing methods known in the art. However, any other suitable coating or incorporation methods may be employed.

In some preferred embodiments, the leuco dye developer is in the second sealing substrate using conventional resin blending technology known in the art.

In some embodiments, the leuco dye developer is applied onto the second sealing substrate using conventional printing methods known in the art. However, any other suitable coating or incorporation methods may be employed.

In some preferred embodiments, the leuco dye developer and leuco dye sensitizer are both applied onto the second sealing substrate using conventional printing methods known in the art. However, any other suitable coating or incorporation methods may be employed.

In some preferred embodiments, the leuco dye developer and leuco dye sensitizer are both in the second sealing substrate using conventional resin blending technology known in the art.

In some preferred embodiments, the leuco dye is coated on the first sealing substrate and the leuco dye developer is in the second sealing substrate.

Generally, leuco dyes are substantially colorless and, upon addition of one or two hydrogen atoms, convert to a colored dye. A wide variety of specific leuco dyes within the above mentioned categories may be suitable for use in the various embodiments as would be understood by those skilled in the art. A more detailed discussion of these types of leuco dyes may be found in U.S. Pat. Nos. 3,658,543 and 6,251,571, each of which is hereby incorporated by reference in their respective entireties. The following non-limiting listing of leuco dyes are suitable for use herein, either individually or in combinations of two or more: acyl auramines, acylleucophenothiazines, alpha-unsaturated aryl ketones, azaphthalides, benzoyl leuco methylene blue, benzoyl leuco oxazine, benzoyl leuco thiazine, beta-unsaturated aryl ketones, basic mono azo dyes, bisindolylphthalide, 10-benzoyl-N,N,N,N-tetraethyl-3,7-diamino-10H-phenoxazine, carbazolyl blue, chromogenic azaphthalide compounds, crystal violet lactone, diaryl phthalides, diphenylmethanes, dithio-oxamide, di[bis-(indoyl)ethyleneyl] tetraholophthalides, fluoran, green lactone, 3-(indol-3-yl)-3-(4-substituted aminophenyl)phthalides, indolyl bis-(indoyl) ethylenes, indolyl red, leucoauramines, leucobenzoyl methylene blue, leuco malachite green, 3-methyl-2,2-spirobi (benzo-[f]-chromene), phenoxazine, phthalide leuco dyes, phthlans, polystyrl carbinols and 8-methoxybenzoindolinospiropyrans, rhodamine beta lactams, spiropyrans, substituted 4,7-diazaphthalides, sultines, para-toluene sulfonate of Michler's hydrol, triarylmethane, triphenylmethanes (gentian violet and malachite green), 3,3-diaryl-3H-2,1-benzoxathiole 1-oxides and mixtures thereof.

One or more leuco dye may be in or on a substrate in any suitable manner and in any suitable concentration. For example, if the leuco dye is in a layer of the substrate, the leuco dye may be present in the layer in an amount from about 0.1% by weight to about 10% by weight, such as from about 0.1% by weight to about 5% by weight. If the leuco dye is in a layer of the substrate, preferably the layer is a heat seal layer.

In some embodiments, where the leuco dyes react with acidic developing agents, the leuco dye developer can be referred to as electron acceptors, but are more accurately described as proton donors. In certain embodiments, the developing agent is water insoluble. In some embodiments, the developing agent is a weak acid selected from, octyl p-hydroxybenzoate, methyl p-hydroxybenzoate, 1,2,3-triazoles, 4-hydroxycoumarin derivatives, and combinations of two or more of the foregoing. In some embodiments, Lewis acids may be used as a developer. Examples of such developers include activated clay substances, such as attapulgite, acid clay, bentonite, montmorillonite, acid-activated bentonite or montmorillonite, zeolite, hoalloysite, silicon dioxide, aluminum oxide, aluminum sulfate, aluminum phosphate, hydrated zirconium dioxide, zinc chloride, zinc nitrate, activated kaolin or other clay. In other embodiments, acidic, organic compounds are useful as a leuco dye developer. Examples of such developers include ring-substituted phenols, resorcinols, salicylic acids (e.g., 3,5-bis (α, α'-dimethylbenzyl) salicylic; 3,5-bis ((γ-methylbenzyl) salicylic acid), or salicyl acid esters and metal salts thereof (e.g., zinc salts). Additional acidic, organic compounds include certain polymeric materials such as, for example, a phenolic polymer, an alkylphenolacetylene resin, a maleic acid/colophonium resin or a partially or fully hydrolyzed polymer of maleic anhydride with styrene, ethylene or vinyl methyl ether, or carboxymethylene. Mixtures of two or more of the monomeric and polymeric acidic, organic compounds may also be used.

In still other embodiments, the leuco dye developer may be selected from phenolic resins or phenolic compounds such as 4-tert-butylphenol; 4-phenylphenol; methylene-bis (p-phenylphenol); 4-hydroxydiphenyl ether; alpha-naphthol; beta-napthol; methyl 4-hydroxybenzoate; benzyl 4-hydroxybenzoate; 4-hydroxydiphenyl sulfone; 4-hydroxyacetophenone; 2,2'-dihydroxydiphenyl; 4,4'-cyclohexylidenephenol; 4,4'-isopropylidenediphenol; 4,4-isopropylidenebis(2-methylphenol); a pyridine complex of zinc thiocyanate; 4,4-bis(4-hydroxyphenyl)valeric acid; hydroquinone; pyrogallol; phoroglucine; p-hydroxybenzoic acid; m-hydroxybenzoic acid; o-hydroxybenzoic acid; gallic acid; 1-hydroxy-2-naphthoic acid.

In some preferred embodiments, the leuco dye developer comprises one or more catechins, such as green tea catechins. For example, the leuco dye developer may comprise a epicatechin derivative, such as one or more of epicatechin, epigallocatechin, epicatechin gallate, and epigallocatechin gallate. In some embodiments, the leuco dye developer comprises green tea extract.

In some preferred embodiments, the leuco dye developer comprises a weak acid selected from the group consisting of bisphenol A, bisphenol S, octyl p-hydroxybenzoate, methyl p-hydroxybenzoate, 1,2,3-triazoles, 4-hydroxycoumarin derivatives, and combinations thereof.

In other preferred embodiments, the leuco dye developer comprises an organic compound selected from the group consisting of ring-substituted phenols, ascorbic acids, octadecanoic acids (stearic acids), resorcinols, salicylic acids. Preferably, the leuco dye developer is octadecanoic acid.

In some preferred embodiments, the leuco dye developer has a pKa of between 3 and 10.

One or more leuco dye developer may be in or on a substrate in any suitable manner and in any suitable concentration. For example, if the leuco dye developer is in a layer of the substrate, the leuco dye developer may be present in the layer in an amount from about 0.1% by weight to about 10% by weight, such as from about 0.1% by weight to about 5% by weight. If the leuco dye developer is in a layer of the substrate, preferably the layer is a heat seal layer.

Preferably, the leuco dye and leuco dye developer are both low- or non-toxic compounds and are suitable for use in food and medical packaging applications.

As stated, interaction between a leuco dye and a leuco dye developer causes a chemical change to take place, thereby altering the color of the leuco dye from substantially white or colorless to substantially colored in appearance. The colored appearance can be generally a dark color such as black or deep colors having a high optical density. Generally, the chemical change in the leuco dye occurs upon application of a predetermined amount of heat and pressure. If a leuco dye sensitizer is present, the leuco dye sensitizer may be selected such that the melting point of the leuco dye sensitizer readily controls the temperature at which the color change occurs.

As used herein a "leuco dye sensitizer" is a compound which in its melted state is capable of dissolving both the leuco dye and the leuco dye developer. The leuco dye sensitizer is intended to facilitate the mixing of the leuco dye and leuco dye developer when the sensitizer has melted. In preferred embodiments, the leuco dye sensitizer has a melting point of between 23° C. and 149° C. which readily dissolves both of the leuco dye and leuco dye developer within this temperature range. The leuco dye sensitizer may be in the first sealing substrate or applied to the surface of the first sealing substrate. Alternatively, the leuco dye sensitizer may be in the second sealing substrate or applied to the surface of the second sealing substrate. In some preferred embodiments, the leuco dye sensitizer is in the first sealing substrate and the second sealing substrate or applied to the surfaces of the first sealing substrate and the second sealing substrate.

In some preferred embodiments, the leuco dye sensitizer is 2,2'-ethylidenebis (4,6-di-tert-butylphenol). Non-limiting examples of commercially available leuco dye sensitizers are sold under the trademark Irganox® supplied by BASF Corporation (Ludwigshafen Germany). A particular suitable leuco dye sensitizer is Irganox® 129.

One or more leuco dye sensitizer may be in or on a substrate in any suitable manner and in any suitable concentration. For example, if the leuco dye sensitizer is in a layer of the substrate, the leuco dye sensitizer may be present in the layer in an amount from about 0.1% by weight to about 10% by weight, such as from about 0.1% by weight to about 5% by weight. If the leuco dye sensitizer is in a layer of the substrate, preferably the layer is a heat seal layer.

Any suitable first sealing substrate and second sealing substrate may be heat sealed to produce a heat-seal condition indicating package as described herein. In some preferred embodiments, at least one of the first substrate and the second substrate comprises a heat seal layer and at least one additional layer selected from the group consisting of a barrier layer, a bulk layer, a protective layer and a tie layer.

One or both of the first heat seal layer and the second heat seal layer may comprise any suitable heat seal layer. A used herein, a "heat seal" layer is a layer capable of fusion bonding by conventional indirect heating means which generate sufficient heat on at least one film contact surface for conduction to the contiguous film contact surface and formation of a bond interface therebetween without loss of the film integrity. The bond interface between contiguous inner layers preferably has sufficient physical strength to withstand the packaging process and subsequent handling.

In some embodiments, the heat seal layer comprises a polyolefin. "Polyolefin" is used herein broadly to include polymers such as polyethylene, ethylene-alpha olefin copolymers (EAO), polypropylene, polybutene, ethylene copolymers having a majority amount by weight of ethylene polymerized with a lesser amount of a comonomer such as vinyl acetate, and other polymeric resins falling in the "olefin" family classification. Polyolefins may be made by a variety of processes well known in the art including batch and continuous processes using single, staged or sequential reactors, slurry, solution and fluidized bed processes and one or more catalysts including for example, heterogeneous and homogeneous systems and Ziegler, Phillips, metallocene, single site and constrained geometry catalysts to produce polymers having different combinations of properties. Such polymers may be highly branched or substantially linear and the branching, dispersity and average molecular weight and may vary depending upon the parameters and processes chosen for their manufacture in accordance with the teachings of the polymer arts.

Examples of suitable polyethylenes include, but are not limited to, polyethylenes such as low density polyethylene ("LDPE"), linear low density polyethylene ("LLDPE"), very low density polyethylene ("VLDPE"), ultra-low density polyethylene ("ULDPE"), medium density polyethylene ("MDPE"), high, density polyethylene ("HOPE"), polyethylenes comprising copolymers of ethylene with one or more ethylene/alpha-olefins ("ethylene/α-olefins") such as butene-1, hexene-1, octene-1, or the like as a comonomer, ethylene/propylene copolymers, polypropylene, propylene/ethylene copolymer, polyisoprene, polybutylene, polybutene, poly-3-methylbutene-1, poly-4-methylpentene-1, ionomers and the like. Low density polyethylene ("LDPE") can be prepared at high pressure using free radical initiators, or in gas phase processes using Ziegler-Natta or vanadium catalysts, and typically has a density in the range of 0.916-0.940 $g/cm^3$. LDPE is also known as "branched" or "heterogeneously branched" polyethylene because of the relatively large number of long chain branches extending from the main polymer backbone. Polyethylene in the same density range, i.e., 0.916 to 0.940 $g/cm^3$, which is linear and does not contain long chain branching is also known; this "linear low density polyethylene" ("LLDPE") can be produced with conventional Ziegler-Natta catalysts or with metallocene catalysts. As used in the present disclosure, the term "linear" is applied to a polymer that has a linear backbone and does not have long chain branching; i.e., a "linear" polymer is one that does not have the long chain branches. Relatively higher density LDPE, typically in the range of 0.928 to 0.940 $g/cm^3$, is sometimes referred to as medium density polyethylene ("MDPE"). Polyethylenes having still greater density are the high density polyethylenes ("HDPEs"), i.e., polyethylenes having densities greater than 0.940 $g/cm^3$, and are generally prepared with Ziegler-Natta catalysts. Very low density polyethylene ("VLDPE") is also known. VLDPEs can be produced by a number of different processes yielding polymers with different properties, but can be generally described as polyethylenes having a density less than 0.916 $g/cm^3$, typically 0.890 to 0.915 $g/cm^3$ or 0.900 to 0.915 $g/cm^3$. Other non-limiting examples of suitable heat seal layer resins include ethylene vinyl acetate copolymers (EVA), blends of polyethylene and ethylene vinyl acetate copolymers, cyclic olefin copolymers (COC),co-polychlorotrifluoroethylene (co-PCTFE), polypropylene (PP), polyethylene terephthalate (PET), and blends thereof. In preferred embodiments, the heat seal layer comprises an ethylene vinyl acetate copolymer or a blend of ethylene vinyl acetate copolymer and polyethylene.

The first or second sealing substrate may include any number of additional m layers depending upon the final requirements of the package.

Protective Layer

One or both of the first sealing substrate or the second sealing substrate may include an outer protective layer. Since it is seen by a consumer or user, the exterior surface of the substrate may preferably have desirable optical properties and may have high gloss. Also, it preferably withstands contact with sharp objects and provides abrasion resistance, and for these reasons it is often termed the abuse resistant layer.

The exterior surface layer should be easy to machine (i.e. be easy to feed through and be manipulated by machines e.g. for conveying, packaging, printing or as part of the film or bag manufacturing process). Suitable stiffness, flexibility, flex crack resistance, modulus, tensile strength, coefficient of friction, printability, and optical properties are also frequently designed into exterior layers by suitable choice of materials. This layer may also be chosen to have characteristics suitable for creating desired heat seals which may be resistance to burn through (e.g., by impulse sealers) or may be used as a heat sealing surface in certain package embodiments (e.g., using overlap seals).

Suitable exterior surface layers may comprise: paper, oriented polyester, amorphous polyester, polyamide, polyolefin, cast or oriented nylon, polypropylene, or copolymers, or blends thereof. Oriented films of this or any other layer may be either uni-axially or bi-axially oriented. The exterior layer thickness is typically 0.5 to 2.0 mils. Thinner layers may be less effective for abuse resistance, however thicker layers, though more expensive, may advantageously be used to produce films having unique highly desirable puncture resistance and/or abuse resistance properties.

Intermediate Layers

One or both of the first sealing substrate and the second sealing substrate may include an intermediate layer. An intermediate layer is any layer between the exterior layer and the interior layer and may include oxygen barrier layers, tie layers or layers having functional attributes useful for the film structure or its intended uses. Intermediate layers may be used to improve, impart or otherwise modify a multitude of characteristics: e.g. printability for trap printed structures, machinability, tensile properties, flexibility, stiffness, modulus, designed delamination, easy opening features, tear properties, strength, elongation, optical, moisture barrier, oxygen or other gas barrier, radiation selection or barrier e.g. to ultraviolet wavelengths, etc. Suitable intermediate layers may include: adhesives, adhesive polymers, paper, oriented polyester, amorphous polyester, polyamide, polyolefin, nylon, polypropylene, or copolymers, or blends thereof. Suitable polyolefins may include: polyethylene, ethylene-alpha olefin copolymers (EAO), polypropylene, polybutene, ethylene copolymers having a majority amount by weight of ethylene polymerized with a lesser amount of a comonomer such as vinyl acetate, and other polymeric resins falling in the "olefin" family classification, LDPE, HDPE, LLDPE, EAO, ionomer, ethylene methacrylic acids (EMA), ethylene acrylic acid (EAA), modified polyolefins e.g. anhydride grafted ethylene polymers, etc.

Tie Layers

One or both of the first sealing substrate and the second sealing substrate may comprise one or more adhesive layers, also known in the art as "tie layers," which can be selected to promote the adherence of adjacent layers to one another in a multilayer film and prevent undesirable delamination. A multifunctional layer is preferably formulated to aid in the adherence of one layer to another layer without the need of using separate adhesives by virtue of the compatibility of the materials in that layer to the first layer and the second layer. In some embodiments, adhesive layers comprise materials found in both the first layer and the second layer. The adhesive layer may suitably be less than 10% and preferably between 2% and 10% of the overall thickness of the multilayer substrate.

Each of the first substrate and the second substrate may independently comprise any suitable number of tie or adhesive layers of any suitable composition. Various adhesive layers are formulated and positioned to provide a desired level of adhesive between specific layers of the film according to the composition of the layers contacted by the tie layers.

The interior, exterior, intermediate or tie layers may be formed of any suitable thermoplastic materials, for example, polyamides, polystyrenes, styrenic copolymers e.g. styrene-butadiene copolymer, polyolefins, and in particular members of the polyethylene family such as LLDPE, VLDPE, HDPE, LDPE, COC, ethylene vinyl ester copolymer or ethylene alkyl acrylate copolymer, polypropylenes, ethylene-propylene copolymers, ionomers, polybutylenes, alpha-olefin polymers, polyesters, polyurethanes, polyacrylamides, anhydride-modified polymers, acrylate-modified polymers, polylactic acid polymers, or various blends of two or more of these materials.

Barrier Layer

One or both of the first sealing substrate and the second sealing substrate may comprise a barrier layer. The barrier layer may function as a gas barrier, a moisture barrier, or as a gas and moisture barrier. A gas barrier layer is preferably an oxygen barrier layer, and is preferably a core layer positioned between and protected by surface layers. For example, an oxygen barrier layer can be in contact with a first surface layer and an adhesive layer or ma be sandwiched between two tie layers and/or two surface layers.

An oxygen barrier is preferably selected to provide an oxygen permeability sufficiently diminished to protect the packaged article from undesirable deterioration or oxidative processes. Preferably a multilayer packaging substrate has have an oxygen transmission rate ($O_2TR$) of less than 150 $cm^3/m^2/24$ hours at 1 atmosphere and 23° C., such as less than 10 $cm^3/m^2$ per 24 hours at 1 atmosphere. To protect oxygen sensitive articles from deterioration from oxygen contact over time, the films may have an $O_2TR$ of less than 1, such as less than 0.1, less than 0.01, or less than 0.001 $cm^3/m^2$ per 24 hours at 1 atmosphere and 23° C.

A moisture barrier is preferably selected to provide a moisture permeability sufficiently diminished to protect an article disposed in the sealed packaging from undesirable deterioration. A preferred film according to various embodiments will have a water vapor transmission rate (WVTR) of less than 15 $g/m^2$ per 24 hours at 38° C. and 90% RH. In some embodiments, a film has a WVTR of less than 1, less than 0.1, or less than 0.01 $g/m^2$ per 24 hours at 38° C. and 90% RH.

A barrier layer can comprise any suitable material and may be any suitable thickness. A gas barrier layer can comprise polyvinyl alcohol (PVOH), ethylene vinyl alcohol (EVOH), polyvinylidene chloride (PVDC), polyamide, polyester, polyalkylene carbonate, polyacrylonitrile, a nanocomposite, a metallized film such as aluminum vapor deposited on a polyolefin etc., as known to those of skill in the art. Suitable moisture barrier layers include aluminum foil, PVDC, fluoropolymers like polychlorotrifluoroethylene (PCTFE), polyolefins such as HDPE, LLDPE and cyclic olefin copolymers (COC), and metallized films such as aluminum vapor deposited on a polyolefin, etc., as known to those of skill in the art. It is desirable that the thicknesses of the barrier layers be selected to provide the desired combination of the performance properties sought (e.g., with respect to oxygen permeability, water vapor permeability, delamination resistance, etc.).

Bulk Layer

The first sealing substrate or the second sealing substrate may comprise any suitable bulk layer. A bulk layer may provide additional functionality such as stiffness or to improve machinability, cost, flexibility, barrier properties, etc. Preferred bulk layers comprise one or more polyolefins such as polyethylene, ethylene-alpha olefin copolymers (EAO), polypropylene, polybutene, ethylene copolymers having a majority amount by weight of ethylene polymerized with a lesser amount of a comonomer such as vinyl acetate, and other polymeric resins falling in the "olefin" family classification. The bulk layer may be of any suitable thickness or may even be omitted for use in certain applications.

In a preferred embodiment, the second sealing substrate is thermoformed.

In some preferred embodiments, the first sealing substrate is formed from material that is different than the material forming the second sealing substrate. In some embodiments, the first sealing substrate comprises paper or a non-woven material. Preferably, the paper or nonwoven material should be porous and have a sufficiently low pore size to prevent penetration by bacteria and other microbial organisms but with sufficiently high pore size to allow gases and/or water vapor to pass through the pores. In a preferred embodiment, the materials for use as the second sealing substrate include, but are not limited to medical grade Kraft paper, especially, uncoated medical grade Kraft paper. A non-limiting example of such paper includes Arjo Ethypel® 60 gram/$m^2$ paper (Arjowiggins SAS, Boulogne Billancourt, France). Additional preferred non-woven materials include spunbonded nonwoven polyolefins such as, but are not limited to, the family of materials sold under the trademark DuPont™ Tyvek® material (E. I. du Pont de Nemours and Company, Wilmington, Del., USA). The second sealing substrate may include any number of additional film layers depending upon the final requirements of the package.

As used herein, the terms "heat-seal" and the like refer to a first portion of a film surface (i.e., formed from a single layer or multiple layers) which is capable of forming a hermetic fusion bond to a second portion of a film surface typically under heat and pressure. A heat-seal layer is capable of fusion bonding by conventional indirect heating means which generate sufficient heat on at least one film contact surface for conduction to the contiguous film contact surface and formation of a bond interface therebetween without loss of the film integrity. It should be recognized that heat sealing can be performed by any one or more of a wide variety of manners, such as using a heat-seal technique (e.g., melt-bead sealing, thermal sealing, impulse sealing, ultrasonic sealing, hot air, hot wire, infrared radiation, etc.).

Definitions

It should be understood that this invention is not limited to the particular methodology, protocols, materials, and reagents described, as these may vary. It is also to be understood that the terminology used herein is for the purpose of describing particular embodiments only, and is not intended to limit the scope of the present invention.

As used herein, singular forms "a," "an" and "the" include plural referents unless the context clearly dictates otherwise.

As used herein, the term "or" is generally employed in its sense including "and/or" unless the content clearly dictates otherwise. The term "and/or" means one or all of the listed elements or a combination of any two or more of the listed elements. The use of "and/or" in certain instances herein does not imply that the use of "or" in other instances does not mean "and/or".

As used herein, "have", "has" "having", "include", "includes", "including", "comprise", "comprises", "comprising" or the like are used in their open ended inclusive sense, and generally mean "include, but, not limited to", "includes, but not limited to" or "including, but not limited to". It will be understood that "consists of" and "consisting of" or "consists essentially of" or consisting essentially of" are subsumed within "comprise", "comprising" and the like. For example, package comprising a first sealing substrate and a second sealing substrate may be a package consisting of, or consisting essentially of, the first and second substrate.

"Optional" or "optionally" means that the subsequently described event, circumstance, or component, can or cannot occur, and that the description includes instances where the event, circumstance, or component, occurs and instances where it does not.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the inventive technology.

Unless defined otherwise all technical and scientific terms used herein have the same meanings as commonly understood by one of ordinary skill in the art to which this invention belongs. All publications and patents specifically mentioned herein are incorporated by reference for all purposes.

BRIEF DESCRIPTION OF THE DRAWINGS

Further features and advantages of the present invention will become apparent from the following detailed description, taken in combination with the appended drawings, in which.

DETAILED DESCRIPTION OF THE INVENTION

Figure 1:
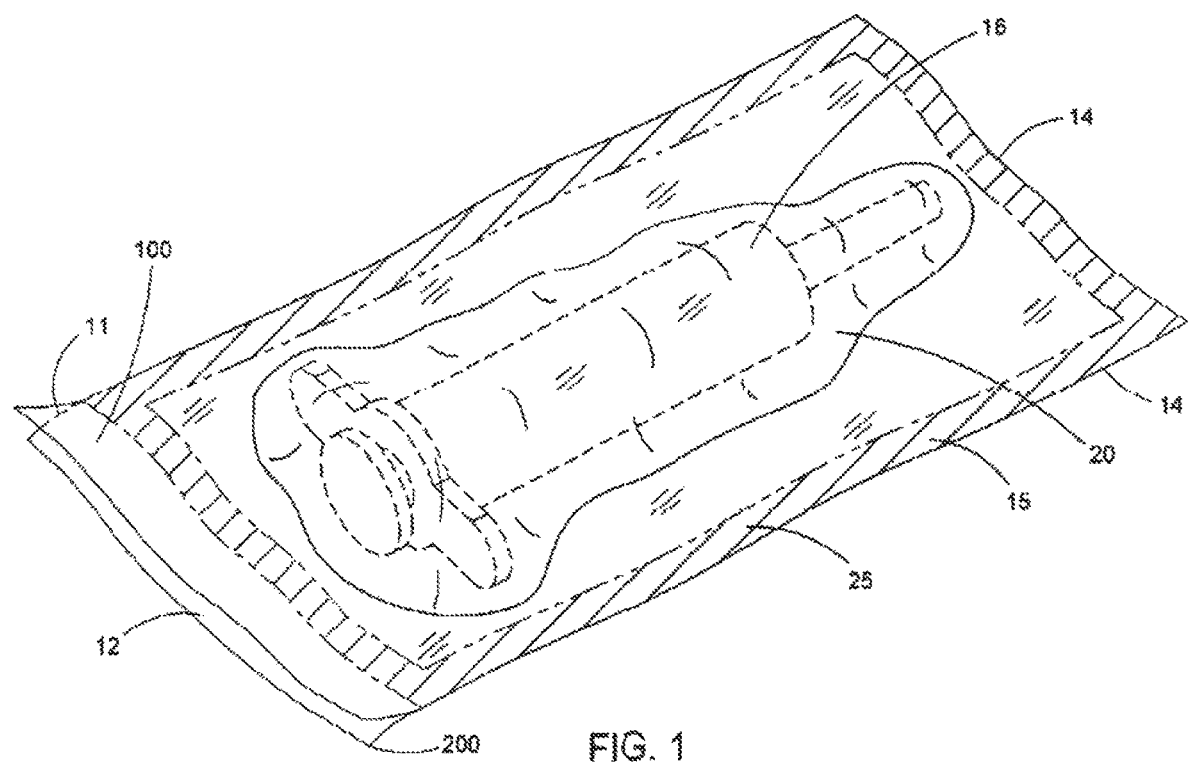
FIG. 1 is a schematic view of an embodiment of a packaged product containing a package as described herein.

The accompanying drawings now will be described in more detail, in which some, but not all embodiments are shown. Indeed, the present inventions may be embodied in many different forms and should not be construed as limited to the embodiments set forth in the drawings. Like numbers refer to like elements throughout.

Shown in FIG. 1 is one embodiment of a packaged product including a heat-seal condition indicating package 10 that comprises a thermoformed component 11 which is formed from a first sealing substrate 100, and a lidding component 12 which is formed from a second sealing substrate 200. The lidding component 12 is adhered to the thermoformed component 11 by a heat and pressure activated heat-seal 15. The heat and pressure activated heat-seal 15 is generally adjacent to a peripheral edge 14 of lidding component 12 and provides a border which surrounds a product cavity 20 for receiving a product 16. In this particular preferred embodiment, package 10 is a gas-sterilizable medical package. When there is sufficient fusion of the first sealing substrate 100 with the second sealing substrate 200, a colored appearance occurs indicating a heat-seal defect-free state 25 within the heat-seal 15. However, when there is a defect or flaw present, the defect will interfere with the mixing of the color components within heat-seal 15. Consequently, there will not be a color change where the defect is present in the heat-seal, and a heat-seal defect state (not shown) will be evident. In this particular example, heat-seal 15 is configured as a fin seal.

In this particular embodiment, the product cavity 15 is formed into the general shape of the product 16 contained therein. Nevertheless, one skilled in the art would appreciate that the thermoformed component 11 may be formed into any shape as desired and may be of various sizes. Package 10 is particularly well suited for packaging of medical products such as, but not limited to, syringes and the like since the paper or nonwoven material of second sealing substrate 200 is porous to gases such as ethylene oxide thus allowing the package contents to be sterilized prior to its ultimate use. It should be understood that package 10 may also package other products such as non-medical products including food items. While package 10 is depicted as having only one cavity 13, it is also contemplated that thermoformed component 11 of the present invention gray include multiple cavities (not shown). While the package depicted in FIG. 1 is shown having a thermoformed component 11, it is also contemplated that the packages of the present invention include bags and pouches which are generally not thermoformed but have a flat component (not shown).

Figure 2:
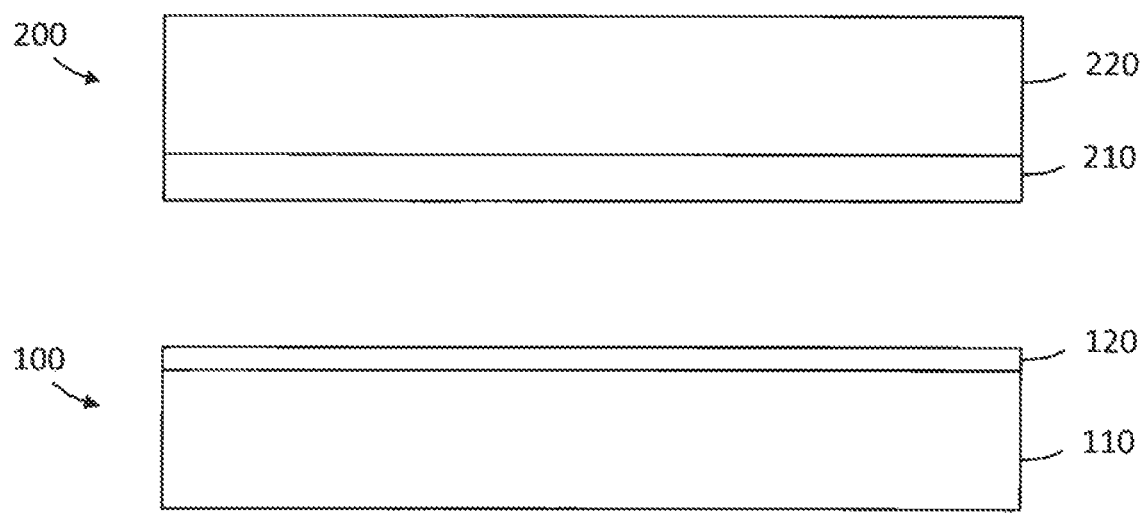
FIG. 2 is a schematic view of an embodiment of a first sealing substrate and a second sealing substrate that may be heat sealed to produce a heat-seal condition indicating package.

Referring now to FIG. 2, an embodiment of first 100 and second 200 sealing substrates are shown. The first sealing substrate 100 includes a coating 120 comprising a leuco dye disposed on a surface of a layer 110 of the substrate 100 that may be heat sealed with the second substrate 200. The coating 120 may be printed on the surface of the layer 110. The second substrate 200 is a multilayer film having a heat seal layer 210 and at least one additional layer 220. The heat seal layer 210 comprises a leuco dye developer and may be heat sealed to the surface of the layer 110 of the first substrate 100 on which the coating 120 is applied.

EXAMPLES

Example 1

In this example, 5 grams of leuco dye of crystal violet lactone was dry blended with 1995 grams of ethylene vinyl acetate copolymer (EVA) (having 2% vinyl acetate content) resin by simply mixing by hand before extrusion. The mixture was fed into a single screw extruder hopper. The single screw extruder temperature profile was set to be (200° F., 250° F., 300° F., or 330° F.) and the dye temperature was set to be 330° F. The screw speed of the extruder was set to be 40 RPM. A 2 mil thick monolayer film was then extruded from this mixture to form the first sealing substrate. A solution containing a 10% (wt.) leuco dye developer of octadecanoic acid (stearic acid) and a 10% (wt) leuco dye sensitizer of 2,2'-ethylidenebis (4,6-di-tert-butylphenol) (Irganox® 129) in isopropyl alcohol was prepared. A 1-mil aliquot of the solution was coated onto a DuPont™ Tyvek® film to form the second sealing substrate. A one-inch wide strip of each substrate was cut and then heat sealed together at 300° F. (149° C.) under 30 psi with a well time of one second.

Example 2

In this example, the first sealing substrate was prepared identical to Example 1 above. A first solution of a 10% (wt.) leuco dye sensitizer of 2,2'-ethylidenebis (4,6-di-tert-butylphenol) (Irganox® 129) in isopropyl alcohol was prepared. A second solution of a 10% (wt.) leuco dye developer of ascorbic acid in water was prepared. A 1-mil aliquot of each solution was then coated onto a Tyvek® film to form the second sealing substrate. A one-inch wide strip of each substrate was cut and then heat sealed together at 300° F. (149° C.) under 30 psi with a dwell time of one second.

Example 3

In this example, the first sealing substrate was prepared identical to Example 1 above. A solution containing a 10% (wt.) leuco dye developer of bisphenol A and a 10% (wt.) leuco dye sensitizer of 2,2'-ethylidenebis (4,6-di-tert-butylphenol) (Irganox® 129) in isopropyl alcohol was prepared. A 1-mil aliquot of the solution was coated onto a Tyvek® film to form the second sealing substrate. A one-inch wide strip of each substrate was cut and then heat sealed together at 300° F. (149° C.) under 30 psi with a dwell time of one second.

Example 4

In this example, the first sealing substrate was prepared identical to Example 1 above. A solution containing a 10% (wt) leuco dye developer of bisphenol S and a 10% (wt.) leuco dye sensitizer of 2,2'-ethylidenebis (4,6-di-tert-butylphenol) (Irganox® 129) in isopropyl alcohol was prepared. A 1-mil aliquot of the solution was coated onto a Tyvek® film to form the second sealing substrate. A one-inch wide strip of each substrate was cut and then heat sealed together at 300° F. (149° C.) under 30 psi with a dwell time of one second.

Example 5

In this example, the first sealing substrate was prepared identical to Example 1 above. A solution containing a 10% (wt.) leuco dye developer of octadecanoic acid (stearic acid) with no leuco dye sensitizer in isopropyl alcohol was prepared. A 1-mil aliquot of the solution was coated onto a Tyvek® film to form the second sealing substrate. A one-inch wide strip of each substrate was cut and then heat sealed together at 300° F. (149° C.) under 30 psi with a dwell time of one second.

Example 6

In this example, the first sealing substrate was prepared identical to Example 1 above. A solution containing a 10% (wt.) leuco dye developer of bisphenol A with no leuco dye sensitizer in isopropyl alcohol was prepared. A 1-mil aliquot of the solution was coated onto a Tyvek® film to form the second sealing substrate. A one-inch wide strip of each substrate was cut and then heat sealed together at 300° F. (149° C.) under 30 psi with a dwell time of one second.

The observations of each of the examples were recorded and the results reported in TABLE 1 below:

TABLE 1

| | Leuco Dye | Leuco Dye Developer | Leuco Dye Sensitizer | Observations |
| --- | --- | --- | --- | --- |
| Example 1 | Crystal Violet | Stearic acid | Irganox 129 | Bright blue after sealing |
| Example 2 | Crystal Violet | Ascorbic acid | Irganox 129 | Bright blue after sealing, but faded quickly |
| Example 3 | Crystal Violet | Bisphenol A | Irganox 129 | Bright blue after sealing |
| Example 4 | Crystal Violet | Bisphenol S | Irganox 129 | Bright blue after sealing |
| Example 5 | Crystal Violet | Stearic acid | — | No color observed after sealing |
| Example 6 | Crystal Violet | Bisphenol A | — | No color observed after sealing |

Example 7

In this example, green tea extract was used as the leuco dye developer. The green tea extract was incorporated in a heat seal layer of a multilayer substrate. The heat seal layer consisted of EVA-polybutene (PB1)+30% green tea extract masterbatch. Green tea extract was loaded at 10% in the masterbatch to yield 3% in the sealing layer. Another multilayer substrate was prepared having a sealing layer as follows: EVA PB1+20% green tea extract masterbatch. Green tea extract was loaded at 10% in the masterbatch yielding 2% in the sealant layer.

The multilayer substrates having the developer in the sealing layer were heat sealed to uncoated Tyvek® film printed with 0.05, 0.1, 0.5 and 1% of crystal violet lactone (Lueco Dye) dissolved in n-propyl acetate. The films were sealed at different temperatures between 220° F. to 300° F. at 40 psi with a dwell time of 1 s.

The seal strength between the films was tested using an Instron machine to perform a 180 degree peel test. As the machine was pulling the sealed strip apart, the peeling force was measured simultaneously. The peak seal strength was measured as the highest peeling force measured in the entire peeling process.

The color change in the heat seal was measured as follows. A lab color based system was employed. A lab color space is a color-opponent space with dimensions L for lightness and a and b for the color-opponent dimensions, based on nonlinearly compressed (e.g. CIE XYZ) coordinates. The three coordinates of CIELAB represent the lightness of the color (L*=0 yields black and L*=100 indicates diffuse white; specular white may be higher), its position between red/magenta and green (a*, negative values indicate green while positive values indicate magenta) and its position between yellow and blue (b*, negative values indicate blue and positive values indicate yellow). Because the leuco dye, once reacted with the developer, is blue, the "b" value was used in this example. The b value was measured using an X-rite Spectrophotometer. The greater the absolute b number, the more intense the blue.

The heat seal conditions were manipulated to provide a good quality seal, minor disruptions in the seal, such as a wrinkle in the film or a low temperature heat seal, or a full disruption in the seal, such as a contaminant between the materials. A good heat seal resulted in a discernable color change (good color saturation). A nor disruption in the seal resulted in a very faint color change (some color saturation, but below an obvious threshold). A full disruption in the seal resulted in no color change.

Figure 3:
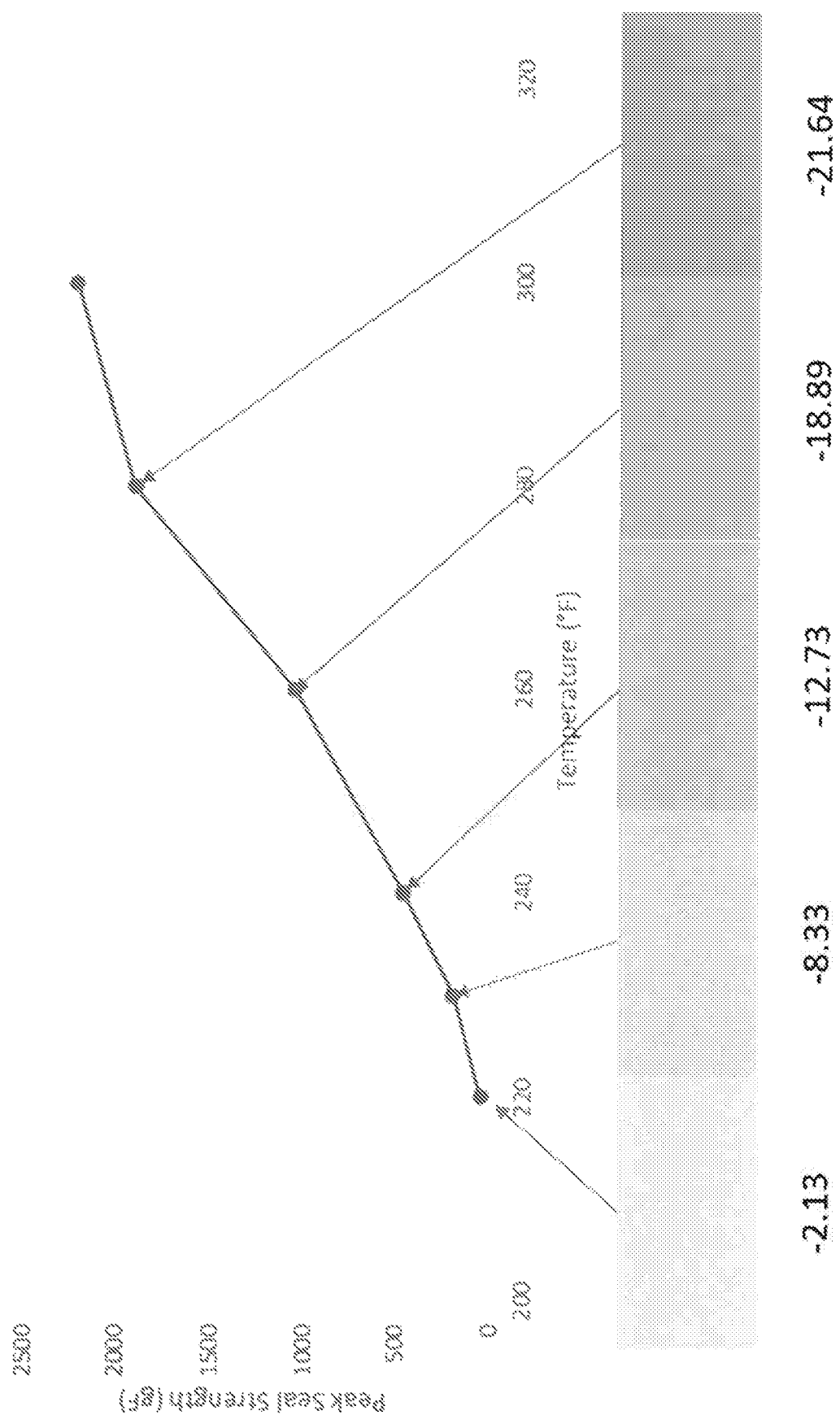
FIG. 3 is a graph of seal strengths at different temperatures between two substrates of a heat-seal condition indicating package and corresponding color changes.

FIG. 3 shows results of testing of color change and seal strengths at different temperatures between 220° F. to 300° F. As the sealing temperature increased from 220° F. to 300° F., the peak seal strength increased from about 10 gF to about 2200 gF. In addition, the color saturation at the heat seal increased as the heat seal temperature increased. For example, under heat seal conditions at 220° F., a faint color change (from b=0 to b=−2.13) was observed. However, as the heat seal temperature increased, the color change became more pronounced at about 280° F. (b=−21.64). A representation of the color change observed is shown below the graph in FIG. 3.

As shown in FIG. 3, a correlation between color saturation and seal quality readily observable.

Figure 4:
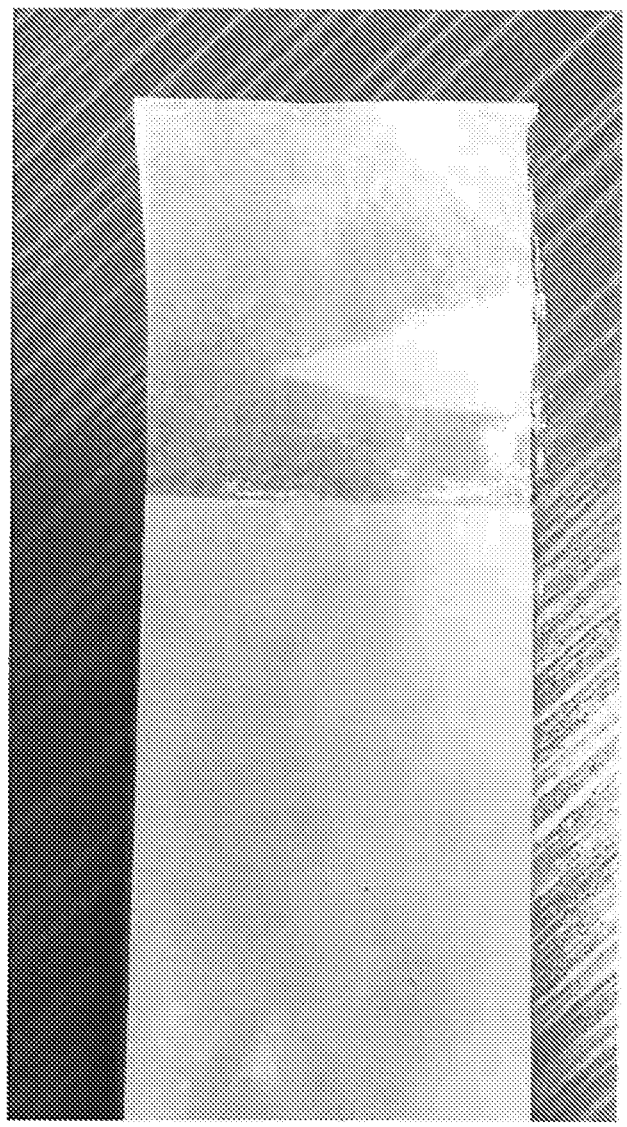
FIG. 4 is an image of a substrate including a leuco dye heat sealed to a substrate having a leuco dye developer in a heat seal region in which a color change has occurred. The portion of the heat seal region in FIG. 4 in which little or no color is visible is a region having a contaminant.

FIG. 4 is an image of Tyvek® film printed with 1% crystal violet lactone (Lueco Dye) dissolved in n-propyl acetate heat sealed to a multilayer film having the EVA-polybutene (PB1)+20% green tea extract masterbatch heat seal layer. As shown in FIG. 4 the heat seal region includes portions in which a color change has occurred and a portion in which no (or little) color change occurred. The portion of the heat seal region in FIG. 4 in which there is no color is a region having a contaminant.

Figure 5:
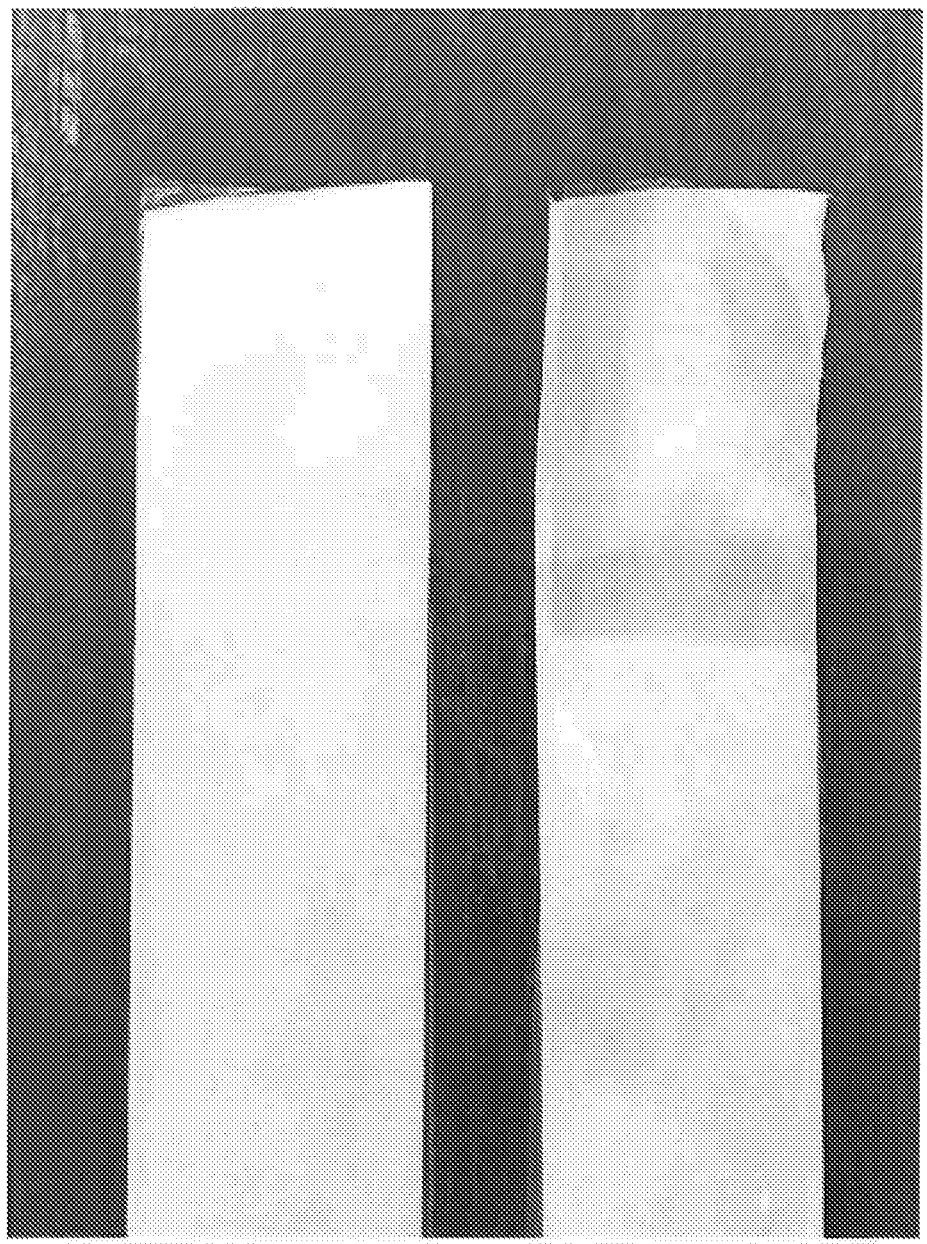
FIG. 5 is an image of two traditional substrates free of leuco dyes and developers, which substrates are heat sealed in a heat seal region (left) and a substrate including a leuco dye heat sealed to a substrate having a leuco dye developer in a heat seal region (right). The heat seal bar contained a contaminant.

FIG. 5 is an image of two heat sealed packages. The package on the right is Tyvek® film printed with 1% of crystal violet lactone (Lueco Dye) dissolved in n-propyl acetate and heat sealed to a multilayer film having the EVA-polybutene (PB1)+20% green tea extract masterbatch heat seal layer. The package on the left is the same as the package on the right except that the films are free of leuco dyes and developers. A contaminant was present on the heat seal bar. As shown on the right, the pale color indicates a poor overall quality seal with some very pale to colorless areas indicating an extremely poor quality seal or no seal. In the absence of the two component indicator, there is little to no evidence of a poor quality seal (left).

The above description and examples illustrate certain embodiments of the present invention and are not to be interpreted as limiting. Selection of particular embodiments, combinations thereof, modifications, and adaptations of the various embodiments, conditions and parameters normally encountered in the art will be apparent to those skilled in the art and are deemed to be within the spirit and scope of the present invention.

What is claimed:

1. A heat-seal condition indicating package comprising:
    a first sealing substrate comprising a leuco dye;
    a second sealing substrate comprising a leuco dye developer; and
    a heat-seal coupling the first sealing substrate to the second sealing substrate, the heat-seal comprising a colored reaction product of the leuco dye and the leuco dye developer,
    wherein an optical characteristic indicative of the colored reaction product in the heat seal is detectable.

2. The heat-seal condition indicating package according to claim 1, wherein a magnitude of the optical characteristic is proportional to a strength of the coupling of the first sealing substrate to the second sealing substrate in the heat-seal.

3. The heat-seal condition indicating package according to claim 2, wherein if the magnitude of the optical characteristic meets or exceeds an application-based absolute threshold along at least a portion of the heat seal, then the at least the portion of the heat-seal is of sufficient strength for a given application.

4. The heat-seal condition indicating package according to claim 2, wherein the package is configured such that, when a strength of the heat seal is consistent along a length of the heat-seal or the heat seal region, a variance in magnitude of the optical characteristic along the heat-seal or heat-seal region does not exceed a variance threshold.

5. The heat-seal condition indicating package according to claim 2, wherein if the magnitude of the optical characteristic does not meet or exceed an absolute threshold for a given application of the package along at least a portion of the heat seal, then the heat-seal is insufficient for the given application.

6. The package according to claim 1, wherein one or both of the first and second sealing substrates comprises a heat seal layer and at least one additional layer selected from the group consisting of a barrier layer, a bulk layer, an exterior protective layer, and a tie layer.

7. The package according to claim 1, wherein the leuco dye is crystal violet lactone.

8. A heat-seal condition indicating package comprising:
    a first sealing substrate comprising a leuco dye;
    a second sealing substrate comprising a leuco dye developer;
    a heat-seal region in which the first sealing substrate is coupled to the second sealing substrate, the heat-seal region comprising a colored reaction product of the leuco dye and the leuco dye developer; and
    a non-seal region adjacent to the heat seal region,
    wherein the colored reaction product provides the heat-seal region with an optical characteristic different than the non-seal region.

9. The heat-seal condition indicating package according to claim 8, wherein a magnitude of a difference in the optical characteristic between the heat-seal region and the non-seal region is proportional to the strength of the coupling of the first sealing substrate to the second sealing substrate in the heat-seal region.

10. The heat-seal condition indicating package according to claim 8, wherein the package is configured such that, when a strength of the heat seal is consistent along a length of the heat seal, a variance in magnitude of the optical characteristic along the heat-seal region does not exceed a variance threshold.

11. The heat-seal condition indicating package according to claim 8, wherein the package is configured such that the difference of (i) a magnitude of the optical characteristic in a first region of the heat seal and (ii) a magnitude of the optical characteristic in a second region of the heat seal region exceeds a differential threshold when a defect is present in the heat-seal.

12. A method, comprising:
providing a first sealing substrate comprising a leuco dye;
providing a second sealing substrate comprising a leuco dye developer; and
heat sealing the first sealing substrate to the second sealing substrate to produce a heat-seal, wherein producing heat-seal results in a change in an optical characteristic at the heat-seal.

13. The method according to claim 12, further comprising:
detecting an optical characteristic at a region in which the first substrate is heat sealed to the second substrate.

14. The method according to claim 13, further comprising:
correlating a magnitude of the detected optical characteristic with a strength of the seal between first sealing substrate and the second sealing substrate.

15. The method according to claim 12, further comprising:
detecting the optical characteristic at a first region in the heat seal region;
detecting the optical characteristic at a second region in the heat seal region; and
comparing magnitudes of the detected optical characteristic between the first and second regions.

16. The method according to claim 15, further comprising:
determining whether a difference between the magnitudes of the detected optical characteristic between the first and second regions meets or exceeds a predetermined differential threshold.

17. The method according to claim 16, further comprising determining that a quality of the heat seal between the first and second substrates is insufficient if the difference meets or exceeds the differential threshold, or determining that a quality of the heat seal between the first and second substrates is sufficient if the difference is below the differential threshold.

18. The method according to claim 12, further comprising:
detecting the optical characteristic indicative of a colored reaction product at a plurality of locations in a region in which the first sealing substrate is heat sealed to the second sealing substrate; and
determining a variance in magnitudes of the detected optical characteristic at the plurality of locations.

19. The method according to claim 12, wherein heat sealing the first sealing substrate to the second sealing substrate produces a package comprising a heat-seal region in which the first sealing substrate is heat sealed to the second sealing substrate and a non-seal region in which the first sealing substrate is not heat sealed to the second sealing substrate.

20. The method according to claim 19, further comprising
detecting an optical characteristic indicative of a colored reaction product at the heat-seal region;
detecting the optical characteristic indicative of the colored reaction product at the non-seal region; and
comparing the optical characteristic detected at the heat-seal region to the optical characteristic detected at the non-seal region.

* * * * *